United States Patent
Teboulle et al.

(10) Patent No.: US 10,716,065 B2
(45) Date of Patent: Jul. 14, 2020

(54) METHOD FOR ACTIVATING A CONNECTED OBJECT

(71) Applicant: SAGEMCOM ENERGY & TELECOM SAS, Rueil Malmaison (FR)

(72) Inventors: Henri Teboulle, Rueil Malmaison (FR); Jean-Paul Lecappon, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 0 days.

(21) Appl. No.: 16/085,646

(22) PCT Filed: Mar. 28, 2017

(86) PCT No.: PCT/EP2017/057263
§ 371 (c)(1),
(2) Date: Sep. 17, 2018

(87) PCT Pub. No.: WO2017/167721
PCT Pub. Date: Oct. 5, 2017

(65) Prior Publication Data
US 2019/0104472 A1    Apr. 4, 2019

(30) Foreign Application Priority Data
Mar. 30, 2016    (FR) ...................... 16 52726

(51) Int. Cl.
*H04W 4/00*    (2018.01)
*H04W 52/02*    (2009.01)
(Continued)

(52) U.S. Cl.
CPC ....... *H04W 52/0225* (2013.01); *H04L 9/0643* (2013.01); *H04L 63/123* (2013.01);
(Continued)

(58) Field of Classification Search
None
See application file for complete search history.

(56) References Cited

U.S. PATENT DOCUMENTS

2002/0120475 A1*   8/2002   Morimoto ............ B65D 5/4212
                                                                                                                                                                   705/4
2007/0118530 A1    5/2007   Chow et al.
(Continued)

FOREIGN PATENT DOCUMENTS

EP          2 573 948 A1    3/2013

OTHER PUBLICATIONS

Jul. 4, 2017 Search Report issued in International Patent Application No. PCT/EP2017/057263.
(Continued)

*Primary Examiner* — Elisabeth Benoit Magloire
(74) *Attorney, Agent, or Firm* — Oliff PLC; R. Brian Drozd (57) ABSTRACT

A method for activating a connected object intended to function in an low power wide area network ("LPWAN") network. The method includes, when it is implemented by the connected object: detecting a first signal transmitted by an external device; when the first signal has predefined characteristics, making the connected object pass from a standby mode to an active mode, only a module of the connected object intended to detect the first signal being activated in standby mode; receiving a second signal comprising a signature from the external device; checking that the signature is in accordance with a predefined signature and, when the signature is in accordance with a predefined signature, obtaining configuration parameters, configuring the connected object in accordance with the configuration parameters obtained and transmitting a connection request message to said network.

7 Claims, 4 Drawing Sheets

(51) Int. Cl.

| | | |
|---|---|---|
| *H04W 4/70* | (2018.01) | |
| *H04L 29/08* | (2006.01) | |
| *H04L 29/06* | (2006.01) | |
| *H04W 76/14* | (2018.01) | |
| *H04W 12/06* | (2009.01) | |
| *H04L 9/06* | (2006.01) | |
| *H04W 8/00* | (2009.01) | |
| *H04W 8/22* | (2009.01) | |
| *H04L 12/24* | (2006.01) | |
| *H04W 24/02* | (2009.01) | |

(52) U.S. Cl.
CPC ............... *H04L 67/12* (2013.01); *H04W 4/70* (2018.02); *H04W 8/005* (2013.01); *H04W 8/22* (2013.01); *H04W 12/0609* (2019.01); *H04W 52/0229* (2013.01); *H04W 76/14* (2018.02); *H04L 41/0806* (2013.01); *H04L 63/0823* (2013.01); *H04L 67/34* (2013.01); *H04W 24/02* (2013.01); *Y02D 70/00* (2018.01)

(56) References Cited

U.S. PATENT DOCUMENTS

| | | | |
|---|---|---|---|
| 2010/0031177 A1* | 2/2010 | Reed | G05B 19/042 715/771 |
| 2012/0262303 A1* | 10/2012 | Fahey | G06F 19/3418 340/870.02 |
| 2015/0097958 A1* | 4/2015 | Fadell | G05B 15/02 348/152 |
| 2016/0007288 A1* | 1/2016 | Samardzija | H04W 52/0229 370/311 |
| 2016/0050566 A1 | 2/2016 | Li et al. | |
| 2018/0270547 A1* | 9/2018 | Pisila | H04Q 9/00 |
| 2018/0276598 A1* | 9/2018 | Y | G06Q 10/087 |

OTHER PUBLICATIONS

Sornin et al; "LoRa Specification V1.0;" LoRa Alliance Inc.; Jan. 31, 2015; XP055286529; retrieved from https://www.lora-alliance.org/portals/0/specs/LoRaWAN Specification 1R0.pdf on Jul. 7, 2016.

* cited by examiner

METHOD FOR ACTIVATING A CONNECTED OBJECT

The invention relates to a method for activating a connected object intended to function in a long-range wireless network and affording low energy consumption, and devices and a system implementing the method.

The internet is gradually being transformed into an extended network, referred to as the "Internet of Things", connecting all kinds of objects that have become connectable, which are referred to as "connected objects". New requirements in terms of networks have therefore appeared, and in particular wireless networks having a greater coverage than conventional cellular networks and allowing to limit the energy consumption of the connected objects. Among these long-range wireless networks affording low energy consumption ("low power wide area network (LPWAN)") mention can be made of networks based on the LoRa (long range) technology and networks based on a communication technology developed by the company Sigfox, referred to as Sigfox terminology. LoRa and Sigfox technologies operate on frequency bands known by the term "ISM band" (industry, science and medical) comprising frequency bands that can be used freely for industrial, scientific and medical applications.

LoRa technology is based on a spread spectrum technology allowing to obtain low transmission rate communications having good robustness in a particularly noisy ISM band.

Sigfox technology is based on an ultra narrow band modulation (UNBM) technology also referred to as very minimum sideband keying (VMSK) or simply minimum sideband modulation.

A network based on LoRa technology (hereinafter referred to as "LoRa network") is composed of base stations or gateways generally placed at high points in order to cover a large geographical area. The gateways are able to detect messages sent in their area by connected objects (also referred to as "equipment" or "terminals" ("endpoints") and to send them to at least one centralised server ("LoRa network server (LNS)"), which will process them.

In a LoRa network, a connected object is not attached to a gateway. All the gateways within range of a connected object can serve as a relay between said connected object and the centralised server. If a gateway happens to decode a message sent by a connected object (uplink), then it retransmits it to the central server for processing. If a message must be transmitted from a centralised server to said connected object (downlink), it is the centralised server that will be responsible for determining which gateway should relay the message.

One of the properties sought in LPWAN networks is therefore low energy consumption. This property relates to the gateways, but also the connected objects themselves. It is in fact not a case of compensating for low energy consumption on the part of the gateways by high energy consumption on the part of the connected objects. The connected object must itself have low energy consumption. Some connected objects are autonomous and include their energy source, for example in the form of batteries. For reasons of reliability, strength and impermeability, some connected objects, for example intended to be out of doors, are not designed to be recharged or to have their energy source changed. Only the energy contained in their energy source on leaving the factory can be used throughout the service life of the connected object. Consequently, in order to maximise the service life of the connected object, it is preferable, as long as the connected object is not actually inserted in the LPWAN network, for it not to consume, or to consume a minimum amount of, the energy contained in its energy source. However, as long as the connected object is not activated, it does not know that it is connected to the LPWAN network. One possible solution would be to introduce an activation means such as a switch on the connected object in order to activate it. However, it is known that introducing a switch onto a device impairs in particular the impermeability of said device, which is incompatible with connected objects intended to be installed out of doors or submerged. For example, a switch may be manipulated by unauthorised persons to activate or deactivate the connected object.

It is desirable to overcome these drawbacks of the prior art. It is in particular desirable to propose a method for activating a connected object when it is inserted in the LPWAN network. Moreover, the method for activating the connected object must preferably be secure so as to prevent unauthorised persons activating the connected object.

It is in addition desirable to propose a method that is simple to implement at low cost.

According to a first aspect of the present invention, the present invention relates to a method for activating a connected object intended to function in a long-range wireless network and affording low energy consumption. The method comprises, when it is implemented by the connected object: detecting (301) a first signal transmitted by an external device; when the first signal has predefined characteristics, making the connected object pass from a standby mode to an active mode, only a module of the connected object intended to detect the first signal being activated in standby mode; receiving a second signal comprising a signature from the external device; checking that the signature is in accordance with a predefined signature and, when the signature is in accordance with a predefined signature, obtaining configuration parameters, configuring the connected object in accordance with the configuration parameters obtained and transmitting a connection request message to said network.

In this way, the connected object consumes a minimum amount of the energy contained in its energy source as long as it is not activated by the external device. In addition, it is necessary for the first and second signals transmitted by the external device to have predefined characteristics for the connected object to be activated, which prevents activation by an unauthorised person.

In one embodiment, the connected object is identified by a first connected-object identifier and the second signal comprises information representing a certificate of the external device, a first hash calculated from said certificate and information representing a second connected-object identifier, the signature being in accordance with the predefined signature when a second hash calculated by the connected object from said certificate is equal to a third hash calculated by the connected object from the first hash and when the information representing the second connected-object identifier corresponds to the first connected-object identifier.

In one embodiment, the configuration parameters are given by an external device in the second signal, or given by a server of said network or given by the external device in the second signal and the server of said network.

In one embodiment, when at least some of the configuration parameters are given by the server of said network, following the transmission of the connection request message to said network by the connected object, the connected object receives a message comprising said parameters from said server.

In one embodiment, following the transmission of the connection request message to said network by the connected object and prior to the reception of the message comprising said parameters, the connected object receives a message enabling connection to the network from the server comprising information indicating that the server has configuration parameters to transmit to the connected object and transmits a message acknowledging reception for said authorisation message so as to cause a sending by the server of the message comprising said parameters.

According to a second aspect of the invention, the invention relates to a method for activating a connected object intended to function in a long-range wireless network and affording low energy consumption. The method comprises, when it is implemented by an external device able to start the connected object: sending a first signal to the connected object intended to make the connected object pass from a standby mode to an active mode, only a module of the connected object intended to detect the first signal being activated in standby mode; sending a second signal comprising a signature to said connected object and awaiting reception of a message requesting connection to said network from the connected object; and ending the message when a connection request message is received.

In one embodiment, after having sent the second signal, the external device awaits reception of a connection request message for a predefined period and resends the first and second signals if, at the end of the predefined period, no connection request message is received by the external device.

In one embodiment, after having sent the second signal, said network is a LoRa network and each communication between the connected object and the server is done by means of a gateway in said network.

According to a third aspect of the invention, the invention relates to a device of the connected object type comprising means for implementing the method according to the first aspect.

According to a fourth aspect of the invention, the invention relates to a device comprising means for implementing the method according to the second aspect.

According to a fifth aspect of the invention, the invention relates to a system comprising a device according to the third aspect and a device according to the fourth aspect.

According to a sixth aspect of the invention, the invention relates to a computer program comprising instructions for the implementation, by a device, of the method according to the first aspect or the method according to the second aspect, when said program is executed by a processor of said device.

According to a seventh aspect, the invention relates to storage means storing a computer program comprising instructions for the implementation, by a device, of the method according to the first aspect or the method according to the second aspect, when said program is executed by a processor of said device.

The features of the invention mentioned above, as well as others, will emerge more clearly from a reading of the following description of an example embodiment, said description being given in relation to the accompanying drawings, among which.

The invention is described hereinafter in a LoRa network context. The invention applies however in other contexts for all types of long-range wireless network affording low energy consumption such as a network based on Sigfox technology.

Figure 1:
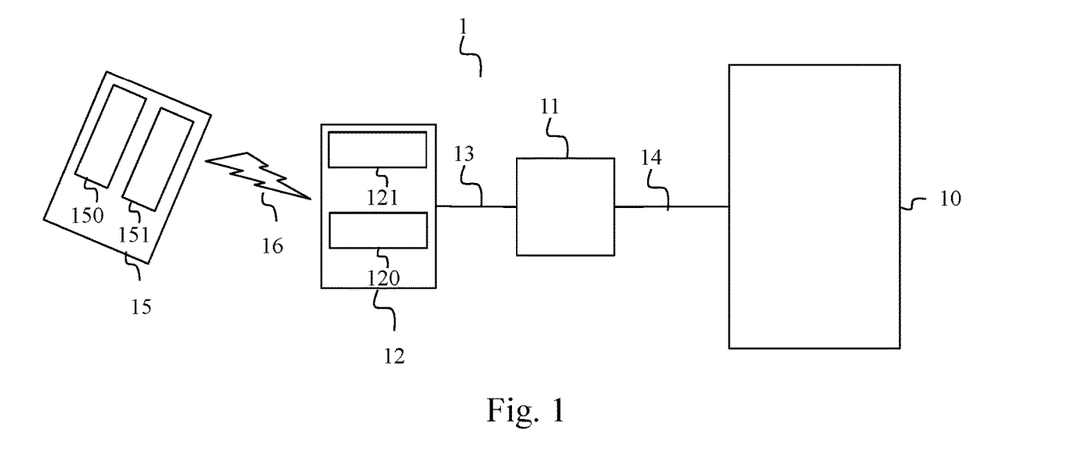
FIG. 1 illustrates schematically an LPWAN network in which the invention is implemented.

FIG. 1 illustrates schematically a LoRa network 1 in which the invention is implemented.

In the example in FIG. 1, the LoRa network 1 comprises a LNS server 10, a gateway 11 and a connected object 12. The gateway 11 communicates with the LNS server 10 by means of a cabled or wireless communication link 14. The gateway 11 communicates with the connected object 12 by means of a wireless communication link 13.

A device 15, external to the LoRa network 1, referred to as an external device 15, is shown. The external device 15 is manipulated by an operator and is used for activating the connected object 12 in a secure manner. To do this, the external device 15 comprises a module 151 sending an activation signal able to activate the connected object 12 in a secure manner. The sending module 151 is for example a module sending a light signal or a module sending an electromagnetic signal. The external device 15 is for example a smartphone or a dedicated device.

The connected object 12 comprises a reception module 121 suitable for receiving the activation signal sent by the external device 15.

Figure 3A:
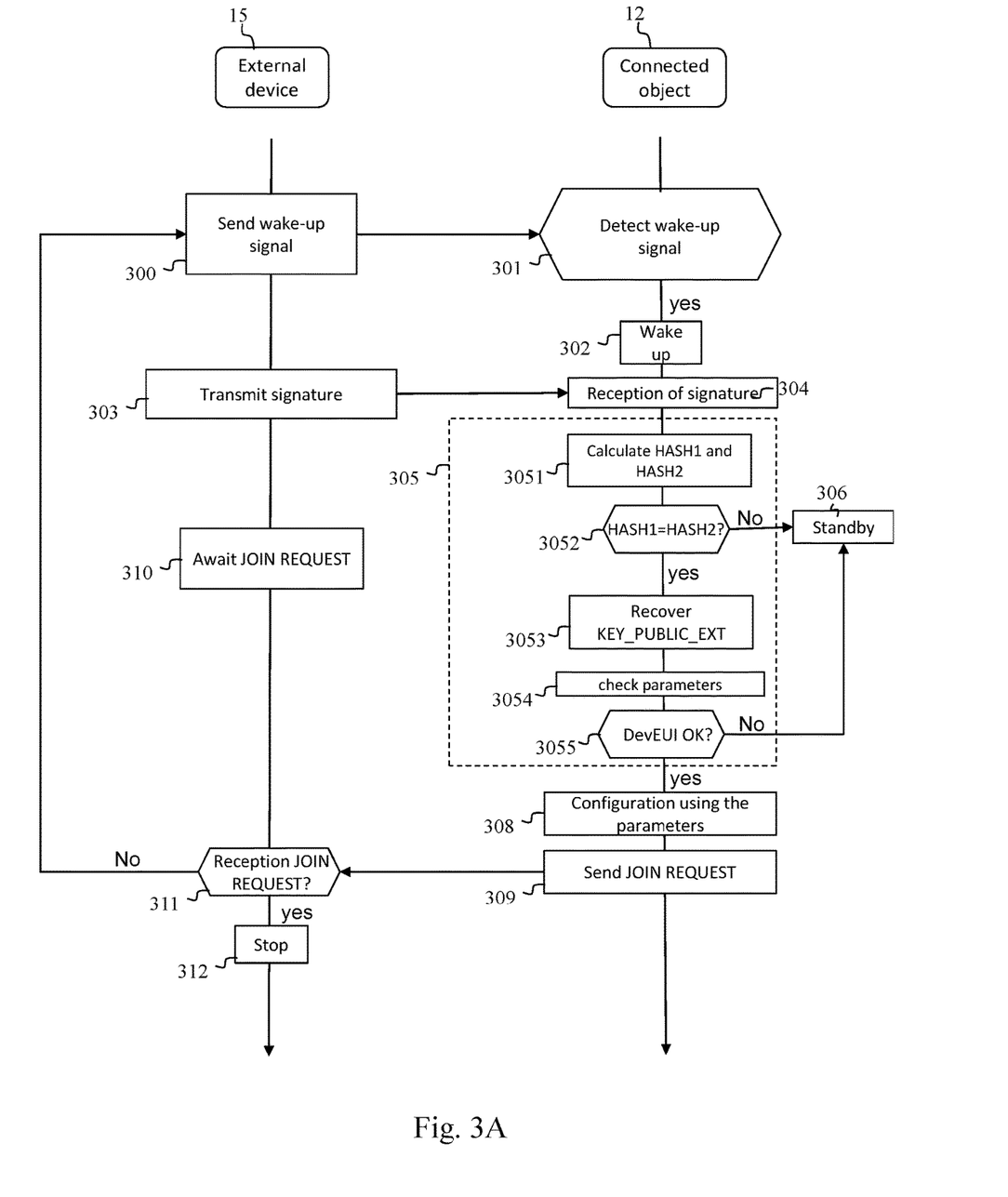
FIG. 3A illustrates schematically a first example of a method for activating a connected objected according to the invention.
Figure 3B:
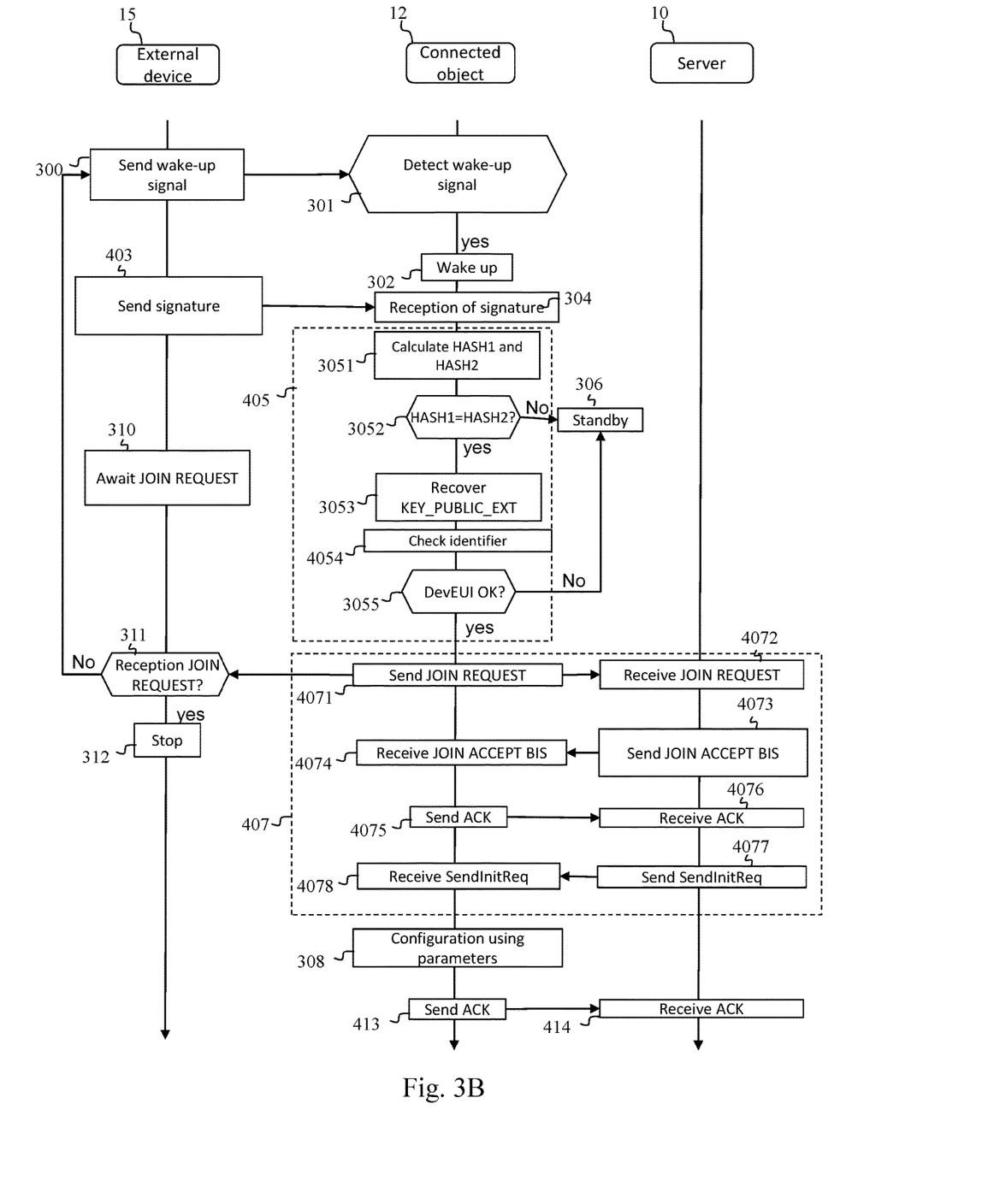
FIG. 3B illustrates schematically a second example of a method for activating a connected object according to the invention.

Moreover, the external device 15 (and respectively the connected object 12) comprises a processing module 150 (and respectively 120) able to implement steps of methods according to the invention described in relation to FIGS. 3A and 3B.

It should be noted that the communications between the connected object 12 and the gateway 11 use messages (or frames) compatible with the LoRaWAN protocol, the message being transmitted in broadcast mode. The document LoRaWAN 1.1 (draft LoRaWAN 1.1) of August 2015 defines communications between the connected objects and gateways in a LoRa network. The messages compatible with the LoRaWAN protocol are referred to as LoRa messages hereinafter.

Figure 2A:
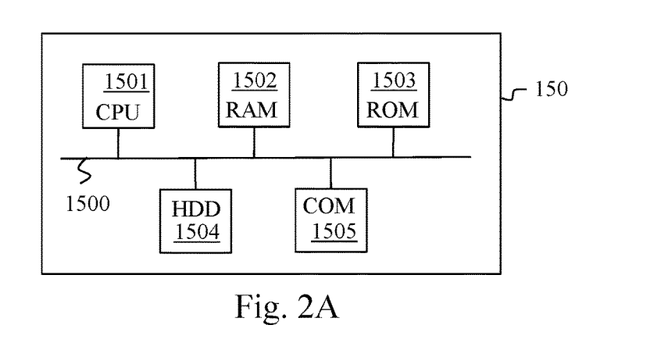
FIG. 2A illustrates schematically a processing module included in an external device.

FIG. 2A illustrates schematically an example of hardware architecture of the processing module 150 included in the external device 15.

According to the example of hardware architecture shown in FIG. 2A, the processing module 150 then comprises, connected by a communication bus 1500: a processor or CPU (central processing unit) 1501; a random access memory (RAM) 1502; a read only memory (ROM) 1503; a storage unit such as a hard disk or a storage medium reader, such as an SD (secure digital) card reader 1504; at least one communication interface 1505 enabling the processing module 150 to communicate with other modules or devices. For example, the communication interface 1505 enables the processing module 150 to receive LoRa messages from the connected object 12 or from the gateway 11.

The processor 1501 is capable of executing instructions loaded in the RAM 1502 from the ROM 1503, from an external memory (not shown), from a storage medium (such as an SD card) or from a communication network. When the external device 15 is powered up, the processor 1501 is capable of reading instructions from the RAM 1502 and executing them. In one embodiment, these instructions form a computer program causing the implementation by the processor 1501 of steps of the methods described below in relation to FIGS. 3A and 3B.

The steps of the methods described in relation to FIGS. 3A and 3B performed by the external device 15 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

Figure 2B:
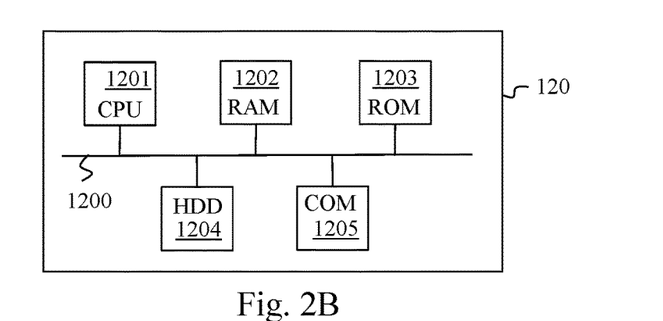
FIG. 2B illustrates schematically a processing module included in a connected object.

FIG. 2B illustrates schematically an example of hardware architecture of the processing module 120 included in the connected object 12.

According to the example of hardware architecture shown in FIG. 2B, the processing module 120 then comprises, connected by a communication bus 1200: a processor or CPU 1201; a random access memory RAM 1202; a read only memory ROM 1203; a storage unit such as a hard disk or a storage medium reader such as an SD card reader 1204; at least one communication interface 1205 enabling the processing module 120 to communicate with other modules or devices. For example, the communication interface 1205 enables the processing module 120 to communicate with the LNS server 10 by means of the gateway 11 or to transmit LoRa messages to the external device 15.

The processor 1201 is capable of executing instructions loaded into the RAM 1202 from the ROM 1203, from an external memory (not shown), from a storage medium, (such as an SD card) or from a communication network. When the connected object 12 passes from a standby mode to an active mode or when the connected object is in the active mode, the processor 1201 is capable of reading instructions from the RAM 1202 and executing them. These instructions form a computer program causing the implementation, by the processor 1201, of steps of the method described below in relation to FIGS. 3A and 3B.

The steps of the methods described in relation to FIGS. 3A and 3B performed by the connected object 12 can be implemented in software form by the execution of a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 3A illustrates schematically a first example of a method for activating a connected object according to the invention.

In the method described in relation to FIG. 3A, only the external device 15 and the connected object 12 are involved in the activation of the connected object 12.

In the example in FIG. 3A, the connected object 12 is an external temperature sensor comprising a temperature measurement module and a clock module, neither shown. This temperature sensor is able to measure temperatures and to detect abnormally high and abnormally low temperatures. A first temperature threshold below which a temperature is considered to be abnormally low and a second temperature threshold above which a temperature is considered to be abnormally high are parameterisable when the connected object 12 is activated. Moreover, the clock module may also be adjusted during the activation of the connected object 12. The connected object 12 can function in accordance with two modes: a standby mode and an active mode. In standby mode, only the reception module 121 of the connected object 12 is activated so that the connected object 12 can detect any activation signal. The standby mode therefore consumes little energy. In one embodiment, in active mode, all the modules of the connected object 12 are activated. As long as the connected object 12 has not been activated by the external device 15, the connected object 12 is in standby mode. When the connected object 12 is in active mode, it is able to send LoRa messages to the LNS server 10 when abnormal temperatures are measured. These LoRa messages then comprise a measured abnormal temperature and information representing the time at which this temperature was measured. The connected object 12 has an identifier in the form of an MAC (media access control) address, named DevEUI, allowing to identify the connected object 12 uniquely.

The external device 15 has a private key KEY_PRIVATE_EXT that has been allocated to it. The external device derives from this a public key KEY_PUBLIC_EXT by applying an encrypting transfer function to the private key KEY_PRIVATE_EXT. The encrypting is for example of the elliptic curve type. The external device 15 also has a certificate relating to a signature method that it can use for signing data using its private key KEY_PRIVATE_EXT. This certificate was allocated by a certification authority that has a public key KEY_PUBLIC_CA and a private key KEY_PRIVATE_CA. Once again, the signature method is of the elliptic curve type. Before the connected object 12 is activated, the external device 15 was parameterised, for example by an operator, so that he knows the MAC address of the connected object 12.

In a step 300, the external device 15, by means of its module 151 for sending an activation signal and under the control of the processing module 150, sends a signal to the connected object 12. The first signal sent by the external device 15 is intended to make the connected object 12 pass from standby mode to active mode. An activation signal able to make the connected object 12 pass from standby mode to active mode is for example a light signal having predefined characteristics such as a duration at least equal to a predefined duration D (for example D=500 ms) and a light intensity at least equal to a predefined light intensity L (for example L=5 lumens).

In one embodiment, the activation signal is a magnetic signal having a duration at least equal to a predefined duration D* (for example D*=500 ms) and an intensity at least equal to an intensity B (for example B=1 tesla).

In a step 301, the reception module 121 of the connected object 12 detects the first signal. When the reception module 121 detects that the first signal has the predefined characteristics representing an activation signal, i.e. for example when a duration d of the first signal is greater than or equal to D and when a light intensity 1 of the first signal is greater than or equal to L, the reception module 121 makes the connected object 12 pass from standby mode to active mode in a step 302. During step 302, all the modules of the connected object 12 and in particular the processing module 120, the temperature measurement module and the clock module are activated. When d<D or 1<L, the reception module 121 considers that the light signal is not an activation signal. The connected object 12 then remains in standby mode.

In a step 303, the external device 15, by means of its module 151 for sending an activation signal and under the control of the processing module 150, transmits a second signal comprising a signature. In one embodiment, the second signal is for example a light signal using a wireless communication technology based on the use of visible light known as Li-Fi (the abbreviation of light fidelity). One principle of Li-Fi technology is based on a coding and a sending of data via a light source amplitude modulation (flickers imperceptible to the eye), according to a standardised protocol.

In one embodiment, the second signal is a periodic magnetic-pulse train having a predefined period. Each pulse having a predefined intensity. A transmission of a pulse for a period indicating a bit at "1". A non-transmission of a pulse for a period indicating a bit at "0". The magnetic-pulse train therefore represents a binary word able to transport information.

The signature comprises M bytes representing the certificate of the external device 15 and N bytes representing a certificate hash (SIGNED_HASH) calculated from the certificate of the external device 15. The certificate is transmitted unencrypted (i.e. transmitted in clear) and includes the public key KEY_PUBLIC_EXT of the external device 15. The certificate hash SIGNED_HASH was calculated by the certification authority by applying first of all a hash function HASH to the certificate (SHA-256 function (secure hash algorithm: a hash function operating on word sizes of 256 bits) typically) and then encrypting the result using the private key KEY_PRIVATE_CA.

The signature further comprises p bytes representing the MAC address DevEUI of the connected object 112. In one embodiment, this MAC address DevEUI was signed by the processing module 150 using the signature method before insertion thereof in the signature.

In the method example described in relation to FIG. 3A, the second signal further comprises P bytes representing configuration parameters of the connected object 12. In the example of the temperature sensor, the configuration parameters are:

A parameter THRESH_TEMP_LOW representing the first temperature threshold coded in one byte;
A parameter THRESH_TEMP_HIGH representing the second temperature threshold coded in one byte;
A parameter YEAR coded in one byte;
A parameter MONTH coded in one byte;
A parameter DAY coded in one byte;
A parameter HOUR coded in one byte;
A parameter MINUTE coded in one byte;
A parameter SECOND coded in one byte.

The parameters YEAR, MONTH, DAY, HOUR, MINUTE, SECOND serve to adjust the clock module of the connected object 12. In one embodiment, the configuration parameters were signed by the processing module 150 using the signature method before insertion thereof in the signature.

In a step 304, the processing module 120 of the connected object 12 receives the second signal from the external device 15 by means of its reception module 121.

In a step 305, the processing module 120 checks that the signature is in accordance with a predefined signature.

To do this, in a step 3051, the processing module 120 calculates a hash HASH1 on the M bytes representing the certificate of the external device 15 by applying the function HASH to the certificate. Then the processing module 120 applies the public key KEY_PUBLIC_CA to the certificate hash SIGNED_HASH in order to obtain a hash HASH2.

In a step 3052, the processing module 120 compares the hash HASH1 with the hash HASH2. If the two hashes are identical, the processing module considers that the signature comes from a certified external device and passes to a step 3053.

If the two hashes differ, the processing module 120 makes the connected object 12 go into standby mode in a step 306.

During step 3053, the processing module 3053 recovers the public key KEY_PUBLIC_EXT integrated in the certificate.

In a step 3054, the processing module 120 uses the public key KEY_PUBLIC_EXT to check the integrity of the configuration parameters and to authenticate the external device 15 by deducing the MAC address and the configuration parameters contained in the second signal by applying a checking method corresponding to the signature method applied by the processing module 150.

In a step 3055, the processing module 120 checks that the MAC address contained in the second signal corresponds to its MAC address DevEUI. If the MAC address contained in the second signal corresponds to the MAC address DevEUI, checking of the signature ends. The processing module 120 considers in fact that not only was the signature generated by a certified external but also that this signature was indeed addressed to the connected object 12. Step 3055 is then followed by a step 308. If on the other hand the MAC address contained in the second signal does not correspond to the MAC address DevEUI, the processing module 120 considers that the checking of the signature has failed (i.e. the signature received was not intended for the connected object 12). The processing module 120 then makes the connected object 12 go into standby mode in step 306.

In a step 308, the processing module 120 configures the connected object 12 with the configuration parameters obtained.

In a step 309, the processing module transmits a LoRa message in broadcast mode corresponding to a request for connection to the LoRa network 1. The message used is a message JOIN REQUEST defined by the LoRaWAN protocol.

In parallel to step 305, as soon as the second signal is transmitted, the processing module 150 of the external device awaited reception of a message JOIN REQUEST for a predefined period, equal for example to ten seconds, during a step 310. If at the end of the predefined period no message JOIN REQUEST is received by the external device 15, the processing module 150 once again performs steps 300, 303 and 310. If a message JOIN REQUEST is received during the predefined period, the processing module 150 ends the steps of the method described in relation to FIG. 3A performed by the external device 15 during a step 312.

It should be noted that the message JOIN REQUEST is also received by the gateway 11, which retransmits it to the LNS server 10. Reception of the message JOIN REQUEST by the LNS server 10 allows to finalise the procedure of insertion of the connected object 12 in the LoRa network 1 as described in the LoRaWAN protocol.

FIG. 3B illustrates schematically a second example of a method for activating a connected object according to the invention.

In the method described in relation to FIG. 3B, the external device 15, the connected object 12 and the LNS server 10 (and indirectly the gateway 11) are involved in the activation of the connected object 12.

In the example in FIG. 3B, the connected object 12 is an external temperature sensor identical to the temperature sensor described in relation to FIG. 3A and has the same MAC address DevEUI.

The external address 15 in FIG. 3B is identical to the external device described in relation to FIG. 3A. It therefore has the same private key KEY_PRIVATE_EXT, deduced therefrom the same public key KEY_PUBLIC_EXT by applying the same encrypting transfer function to the private key KEY_PRIVATE_EXT, has the same certificate relating to the same signature method and was parameterised with the MAC address of the connected object 12.

Steps 300 to 302 in FIG. 3B are identical to the corresponding steps described in relation to FIG. 3B.

In a step 403 replacing step 303, the external device 15, by means of its module for sending an activation signal 151 and under the control of the processing module 150, transmits a second signal comprising a signature. As in the case with step 303, the second signal transmitted during step 403 is for example a light signal using Li-Fi technology. The signature comprises M bytes representing the certificate of the external device 15 and N bytes representing a certificate hash SIGNED_HASH calculated from the certificate of the external device 15. The certificate is transmitted unencrypted (i.e. transmitted in clear) and includes the public key KEY_PUBLIC_EXT of the external device 15. The hash of the certificate SIGNED_HASH was calculated by the certification authority by applying first of all the function HASH to the certificate, and then encrypting the result using the private key KEY_PRIVATE_CA.

The signature further comprises p bytes representing the MAC address DevEUI of the connected object 12. In one embodiment, this MAC address DevEUI was signed by the processing module 150 using the signature method before insertion thereof in the signature.

Unlike the second signal transmitted during step 303, the second signal transmitted during step 403 comprises no configuration parameter of the connected object 12.

Step 304 in FIG. 3B is identical to step 304 described in relation to FIG. 3A.

In a step 405 replacing step 305, the processing module 120 checks that the signal transmitted during step 403 is in accordance with a predefined signature.

To do this, the processing module 120 performs steps 3051, 3052 and 3053 described in relation to FIG. 3A.

During a step 4054 replacing step 3054, the processing module 120 uses the public key KEY_PUBLIC_EXT to check only the MAC address DevEUI contained in the second signal by applying a checking method corresponding to the signature method applied by the processing module 150.

Step 4054 is followed by step 3055 already described in relation to FIG. 3A.

If the hash HASH1 calculated during step 3051 differs from the hash HASH2 or if the MAC address included in the second signal differs from the MAC address DevEUI of the connected object, as in FIG. 3A, steps 3052 and 3055 are followed by step 306, during which the processing module 120 puts the connected object 12 back in standby mode.

Otherwise step 3055 is followed by a step 4071. During step 4071, the processing module 120 transmits a message JOIN REQUEST in broadcast mode.

In parallel to step 405, as soon as the second signal is transmitted, the processing module 150 of the external device 15 performs step 310 and awaits reception of a message JOIN REQUEST during a predefined period. If at the end of the predefined period no message JOIN REQUEST is received by the external device 15, the processing module 150 once again performs steps 300, 403 and 310. If a message JOIN REQUEST is received during the predefined period, the processing module 150 performs step 312 during which it ends the steps of the method described in relation to FIG. 3B performed by the external device 15.

In the example of a method described in relation to FIG. 3B, the LNS server 10 plays an active role in the configuration of the connected object 12 since it is it that provides the configuration parameters of the connected object 12.

In a step 4072, the LNS server 10 receives the message JOIN REQUEST by means of the gateway 11.

In a step 4073, in response to the message JOIN REQUEST, the LNS server 10 transmits a LoRa message enabling the connected object 12 to be inserted in the LoRa network 1. The message transmitted by the LNS server during step 4073 is very similar to a message JOIN ACCEPT defined by the LoRaWAN protocol. We call this LoRa message message JOIN ACCEPT BIS.

Figure 4A:
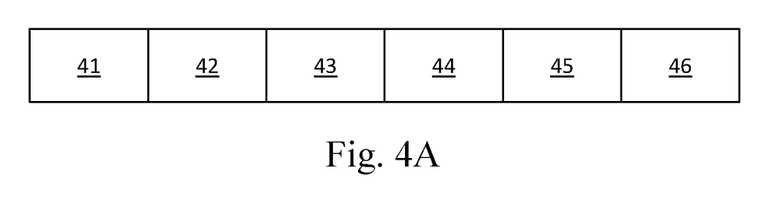
FIG. 4A illustrates schematically a LoRa message enabling a connected object to be inserted in a LoRa network.

FIG. 4A illustrates schematically the LoRa message JOIN ACCEPT BIS enabling the connected object 12 to be inserted in the LoRa network 1.

The message JOIN ACCEPT BIS comprises a field AppNonce 41 coded in three bytes, a field NetID 42 coded in three bytes, a field DevAddr 43 coded in four bytes, a field RxDelay 45 coded in one byte and an optional field CFList 46 coded in sixteen bytes. The fields AppNonce 41, NetID 42, DevAddr 43, RxDelay 45 and CFList 46 are identical to the fields with the same names of the messages JOIN ACCEPT described in the LoRaWAN protocol. The message JOIN ACCEPT BIS further comprises a field DLSettings BIS 44 coded in one byte detailed in FIG. 4B. The field DLSettings BIS 44 replaces a field DLSettings present in the messages JOIN ACCEPT defined by the LoRaWAN protocol.

Figure 4B:
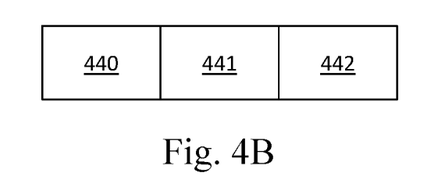
FIG. 4B illustrates schematically a LoRa message field enabling a connected object to be inserted in a LoRa network.

FIG. 4B illustrates schematically the field DLSettings BIS 44 of the message JOIN ACCEPT BIS.

The field DLSettings BIS 44 comprises a field RX1DRoffset 441 coded in three bits and a field RX2 Data Rate 442 coded in four bits. The fields RX1DRoffset 441 and RX2 Data Rate are identical to the fields with the same names of the field DLSettings of the messages JOIN ACCEPT described in the LoRaWAN protocol. The field DLSettings BIS further comprises a field PARAM 440 coded in one bit. This field PARAM replaces a field FPending with the same size of the field DLSettings.

The field PARAM is used by the LNS server 10 to indicate to the connected object 12 that the LNS server 10 has configuration parameters to transmit to the connected object 12. When the field PARAM is at the value "1", the LNS server 10 has configuration parameters to transmit to the connected object 12. When the field PARAM is at the value "0", the LNS server 10 does not have a configuration parameter to transmit to the connected object 12.

During step 4073, the LNS server 10 transmits a message JOIN ACCEPT BIS in which the field PARAM is at "1" to the connected object 12 by means of the gateway 11.

During a step 4074, the processing module 120 receives the message JOIN ACCEPT BIS. The processing module 120 then knows that the LNS server 10 has configuration parameters to transmit to it.

In a step 4075, the processing module 120 transmits to the LNS server 10 an acknowledgement of receipt for the message JOIN ACCEPT BIS.

In a step 4076, the LNS server 10 transmits the acknowledgment of receipt transmitted during step 4075. In response to this acknowledgement of receipt, the LNS server 10 transmits to the connected object 12 during a step 4077 a LoRa configuration message called sendInitReq. The message sendInitReq is used by the LNS server 10 to transmit configuration parameters to the connected object 12.

Figure 5:
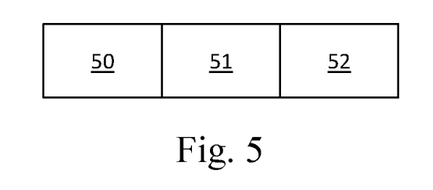
FIG. 5 illustrates schematically a LoRa message enabling a server in a LoRa network to transmit configuration parameters to a connected object.

FIG. 5 illustrates schematically a message sendInitReq enabling the LNS server 10 to transmit configuration parameters to the connected object 12.

The message sendInitReq comprises a field MODE 50 coded in one byte, a field FPORT 51 coded in one byte and a field DATA 52 of variable length.

The field MODE 50 indicates whether or not the message sendInitReq must be acknowledged by the connected object 12 using an acknowledgement of receipt.

The field FPORT corresponds to a logic port number used for sending the messages.

The field DATA 52 comprises the configuration parameters intended for the connected object 12. In the example where the connected object 12 is a temperature sensor, it allows to transmit to the connected object the parameters THRESHOLD_TEMP_LOW, THRESHOLD_TEMP_HIGH, YEAR, MONTH, DAY, HOUR, MINUTE and SECOND.

In a step 4078, the processing module 120 receives the message sendInitReq containing the configuration parameters.

It should be noted that steps 4071 to 4078 may be considered to be a global step 407 allowing to obtain the configuration parameters.

Following the reception of the message sendInitReq, the processing module configures the connected object 12 according to the configuration parameters received during step 308 already explained in relation to FIG. 3A.

If the field MODE of the message sendInitReq indicates that the message sendInitReq must be acknowledged, the processing module 120 performs step 413, during which it transmits to the LNS server 10 by means of the gateway 11 an acknowledgement of receipt for the message sendInitReq.

During a step 414, the LNS server 10 receives the acknowledgement of receipt transmitted during step 413. The LNS server 10 then considers that the configuration of the connected object 12 has taken place correctly.

In one embodiment, if, following the transmission of the message sendInitReq, the LNS server 10 does not receive an acknowledgement of receipt (whereas an acknowledgement of receipt was requested in the field MODE of the message sendInitReq) by the end of a predefined period, for example ten seconds, the LNS server 10 retransmits the message sendInitReq.

In one embodiment, configuration parameters are transmitted by the external device 15 in the second signal and configuration parameters are transmitted by the LNS server 10 in a message sendInitReq. In this embodiment, the steps 300 to 306, 308 and 310 to 312 are performed by the external device 15 and the connected object 12 as described in relation to FIG. 3A, and steps 4071 to 4078, 413 and 414 are performed by the connected object 12 and the LNS server 10 as described in relation to FIG. 3B. When the same parameter has been transmitted both by the external device 15 and the LNS server 10, the parameter transmitted by the server 10 is not taken into account when the connected object 12 is configured. In this embodiment, the activation of the connected object 12 is handled conjointly by the external device 15 and the LNS server 10.

The invention claimed is:

1. A secured method for activating a connected object when it is inserted in a low power wide area network ("LPWAN") network, the method comprises, when it is used by the connected object:
    detecting, from a standby mode in which only a module of the connected object is activated for detecting a first signal, the first signal transmitted by an external device;
    when the first signal has predefined characteristics, making the connected object to pass from the standby mode to an active mode;
    receiving, in the active mode, a second signal comprising a signature from the external device;
    checking that the signature is in accordance with a predefined signature, and,
    when the signature is in accordance with the predefined signature, obtaining configuration parameters, configuring the connected object in accordance with the configuration parameters obtained and transmitting a message requesting connection to said LPWAN network;
    at least some of the configuration parameters are received in a message transmitted by a server of said LPWAN network following the transmission of the message requesting connection to said LPWAN network by the connected object; and
    following the transmission of the message requesting connection to said LPWAN network by the connected object and prior to the reception of the message comprising said parameters, the connected object receives a message enabling connection to the LPWAN network from the server comprising information indicating that the server has configuration parameters to transmit to the connected object and transmits a message acknowledging receipt for said enabling message to cause a sending by the server of the message comprising said parameters.

2. The method according to claim 1, wherein the connected object is identified by a first connected-object identifier and the second signal comprises information representing a certificate of the external device, a first hash calculated from said certificate, and information representing a second connected-object identifier, the signature being in accordance with the predefined signature when a second hash calculated by the connected object from said certificate is equal to a third hash calculated by the connected object from the first hash and when the information representing the second connected-object identifier corresponds to the first connected-object identifier.

3. The method according to claim 2, wherein some of the configuration parameters are given by the external device in the second signal.

4. The method according to claim 1, wherein said LPWAN network is a LoRa network and each communication between the connected object and the server is done by means of a gateway in said LPWAN network.

5. A device of the connected object type comprising circuitry configured for implementing the method according to any of claim 1.

6. A computer program embodied in a non-transitory computer readable medium, the computer program comprising instructions for the implementation, by a device, of the method according to claim 1, when said program is executed by a processor of said device.

7. A non-transitory storage medium, storing a computer program comprising program code instructions which can be loaded in a programmable device to cause said programmable device to implement, the method according to claim 1, when said program is executed by a processor of said device.

\* \* \* \* \*